United States Patent
Rahman et al.

(10) Patent No.: US 11,511,691 B2
(45) Date of Patent: Nov. 29, 2022

(54) ENERGY ABSORBER FOR SENSOR PROTECTION

(71) Applicant: Nissan North America, Inc., Franklin, TN (US)

(72) Inventors: Md Hafizur Rahman, Troy, MI (US); Omar Fernando Carrillo Fernandez, Toluca (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/093,898

(22) Filed: Nov. 10, 2020

(65) Prior Publication Data
US 2021/0053521 A1 Feb. 25, 2021

Related U.S. Application Data

(63) Continuation of application No. 16/205,802, filed on Nov. 30, 2018, now Pat. No. 10,850,697.

(51) Int. Cl.
| | |
|---|---|
| *B60R 19/18* | (2006.01) |
| *B60R 19/48* | (2006.01) |
| *B60R 19/24* | (2006.01) |
| *B60R 21/01* | (2006.01) |

(52) U.S. Cl.
CPC ............. *B60R 19/48* (2013.01); *B60R 19/18* (2013.01); *B60R 19/24* (2013.01); *B60R 2019/1866* (2013.01); *B60R 2019/1873* (2013.01); *B60R 2021/01013* (2013.01)

(58) Field of Classification Search
CPC .................... B60R 19/19; B60R 19/48; B60R 2021/01013; B60R 2021/01027; B60R 2021/343; B60R 19/18

USPC ........................................................ 296/117
See application file for complete search history.

(56) References Cited

U.S. PATENT DOCUMENTS

| | | | |
|---|---|---|---|
| 4,598,001 A | 7/1986 | Watanabe et al. | |
| 5,799,991 A | 9/1998 | Glance | |
| 9,673,517 B2 | 6/2017 | Tran et al. | |
| 2002/0149214 A1 | 10/2002 | Evans | |
| 2007/0090931 A1 | 4/2007 | Hawes et al. | |
| 2009/0024323 A1 | 1/2009 | Tanabe | |

(Continued)

FOREIGN PATENT DOCUMENTS

| | | | | |
|---|---|---|---|---|
| DE | 102016113563 A1 | * | 1/2017 | ............. B60R 19/18 |
| KR | 20040049393 A | * | 6/2004 | |
| WO | 2016/136165 A1 | | 9/2016 | |

*Primary Examiner* — Dennis H Pedder
(74) *Attorney, Agent, or Firm* — Young Basile Hanlon & MacFarlane, P.C.

(57) ABSTRACT

A vehicle includes: a bumper assembly defining opposite lateral ends and an overall width extending therebetween, the bumper assembly defining a recessed area located between the opposite lateral ends thereof; an electronic sensor supported by the bumper assembly in cantilevered relation; and an energy absorber positioned within the recessed area to protect the electronic sensor and reduce dislocation of the electronic sensor by absorbing energy resulting from an impact between the vehicle and an external object. The energy absorber defines opposite lateral ends and an overall width extending therebetween less than that the overall width of the bumper assembly such that the opposite lateral ends of the energy absorber are spaced inwardly from the opposite lateral ends of the bumper assembly.

14 Claims, 13 Drawing Sheets

(56) References Cited

U.S. PATENT DOCUMENTS

| | | |
|---|---|---|
| 2015/0266438 A1 | 9/2015 | Ghannam et al. |
| 2016/0137230 A1* | 5/2016 | Taneda .................... G01S 7/02 296/193.09 |
| 2018/0290612 A1* | 10/2018 | Ikeno .................... B60R 21/34 |
| 2019/0023206 A1 | 1/2019 | Yoshida et al. |

\* cited by examiner

ENERGY ABSORBER FOR SENSOR PROTECTION

CROSS-REFERENCE TO RELATED APPLICATION(S)

This application is a continuation application of U.S. application patent Ser. No. 16/205,802, filed Nov. 30, 2018, the entire disclosure of which is hereby incorporated by reference.

TECHNICAL FIELD

The present disclosure relates generally to vehicles, and, more specifically, to energy absorbers that are positioned to mitigate damage to, and/or dislocation of, one or more sensors in vehicles.

BACKGROUND

Many vehicles include one or more sensors (e.g., radar sensors, emergency braking sensors, intelligent cruise control sensors, pedestrian sensors, etc.) located at the front-end and/or the rear-end of the vehicle. For example, such sensors are often mounted to, or otherwise associated with, the front and/or rear bumpers of the vehicle. During low-force impacts, these sensors can be damaged, dislocated, or otherwise disturbed. To address such issues, the present disclosure describes energy absorbers that are configured and positioned to absorb forces, shock, etc. that might otherwise be communicated to the sensors and/or the sensor mounts.

SUMMARY

In one aspect of the present disclosure, a vehicle is disclosed that includes: a bumper beam; an electronic sensor that is fixed in relation to the bumper beam; and an energy absorber that is connected to the bumper beam in general alignment with the electronic sensor. The energy absorber is configured and positioned to protect the electronic sensor and reduce dislocation of the electronic sensor by absorbing energy resulting from a low-force impact between the vehicle and an external object.

In certain embodiments, the energy absorber is connected to an end face of the bumper beam (e.g., a front face or a rear face of the bumper beam) such that the energy absorber is positioned outwardly (e.g., forwardly or rearwardly) of the electronic sensor.

In certain embodiments, the electronic sensor and the energy absorber may each define a width that extends in generally parallel relation to the bumper beam, wherein the width of the energy absorber is greater than or equal to the width of the electronic sensor.

In certain embodiments, the energy absorber may include a foam having a density greater than 10 pcf.

In certain embodiments, the energy absorber may include at least one brace that is configured for contact with the bumper beam to vertically support the energy absorber.

In certain embodiments, the energy absorber may include a body having a non-uniform cross-sectional configuration.

In certain embodiments, the body of the energy absorber may include a generally L-shaped (non-uniform) cross-sectional configuration.

In certain embodiments, the energy absorber may be configured as a bracket. In such embodiments, the bracket may include a first end wall, a pair of side walls that extend from the first end wall, and an open interior region to allow for deformation of the energy absorber during the low-force impact.

In certain embodiments, the bracket may further include a second end wall that connects the side walls. In such embodiments, the second end wall may include a mounting structure to facilitate connection of the bracket to the bumper beam.

In certain embodiments, the bracket may further include a pair of flanges that extend from the side walls. In such embodiments, the flanges may be oriented in generally parallel relation to the first end wall and may each include a mounting structure to facilitate connection of the bracket to the bumper beam.

In certain embodiments, the energy absorber may include a first absorption member and a second absorption member that is connected to the first absorption member. In such embodiments, the first absorption member may include (e.g., may be formed from) a first material, and the second absorption member may include (e.g., may be formed from) a second material that is different from the first material. For example, the first material may be metallic, and the second material may include a foam.

In another aspect of the present disclosure, a vehicle is disclosed that includes a bumper beam; an electronic sensor that is fixed in relation to the bumper beam; and an energy absorber that is connected to an end face of the bumper beam (e.g., a front face or a rear face of the bumper beam) such that the energy absorber is positioned outwardly (e.g., forwardly or rearwardly) of the electronic sensor along a length of the vehicle and in general alignment with the electronic sensor. The energy absorber includes a foam body that is configured and positioned to absorb energy during a low-force impact between the vehicle and an external object to protect the electronic sensor and reduce dislocation of the electronic sensor.

In certain embodiments, the electronic sensor and the energy absorber may be centrally positioned in relation to the bumper beam.

In certain embodiments, the electronic sensor and the energy absorber may each define a width that extends in generally parallel relation to the bumper beam, wherein the width of the energy absorber is greater than or equal to the width of the electronic sensor.

In certain embodiments, the foam body may include an expanded polypropylene foam having a density greater than 10 pcf.

In certain embodiments, the foam body may include a generally L-shaped (non-uniform) cross-sectional configuration.

In another aspect of the present disclosure, a method is disclosed for protecting an electronic sensor in a vehicle during a low-force impact between the vehicle and an external object. The method includes securing an energy absorber to a bumper beam of the vehicle such that the energy absorber is positioned outwardly of the electronic sensor and in general alignment with the electronic sensor, wherein the energy absorber defines a width extending in generally parallel relation to the bumper beam that is greater than or equal to a width of the electronic sensor.

In certain embodiments, securing the energy absorber to the bumper beam may include positioning a foam body of the energy absorber vertically below the electronic sensor.

In certain embodiments, securing the energy absorber to the bumper beam may include connecting a bracket to the bumper beam. In such embodiments, the bracket may include an open interior region to allow for deformation of the bracket during the low-force impact.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes various embodiments of energy absorbers for use with vehicles to absorb forces, shock, etc., during low-force impacts with external objects, such as other vehicles, structures, etc., which may range from 2 mph to 5 mph (or more) depending upon the size, weight, and configuration of the external object(s). The presently disclosed energy absorber may be positioned in the front-end and/or the rear-end of a vehicle (e.g., on an end face of the front and/or rear bumper beam) and are in general lateral alignment with the sensor(s) (i.e., along the width of the vehicle). The energy absorber may include (e.g., may be formed from) any suitable materials or combination of materials, including, for example, metallic materials (e.g., aluminum, steel, etc.) and/or non-metallic materials (e.g., foam), and may be secured (e.g., to the bumper beam(s)) in any suitable manner, such as, for example, through the use of mechanical fasteners (e.g., screws, rivets, pins, clips, bolts, etc.), welds, adhesive(s), etc. Depending upon the particular application and the particular vehicle in which the energy absorber is employed, the configuration of the energy absorber may be varied. For example, the energy absorber may include a uniform, generally polygonal (e.g., rectangular or square) cross-sectional configuration, or the energy absorber may include a more complex, non-uniform cross-sectional configuration. For example, the energy absorber may include a generally L-shaped cross-sectional configuration, or the energy absorber may be configured as a bracket defining an open interior region to allow for deformation of the energy absorber during low-force impacts, and, thus, the absorption of energy.

Figure 1:
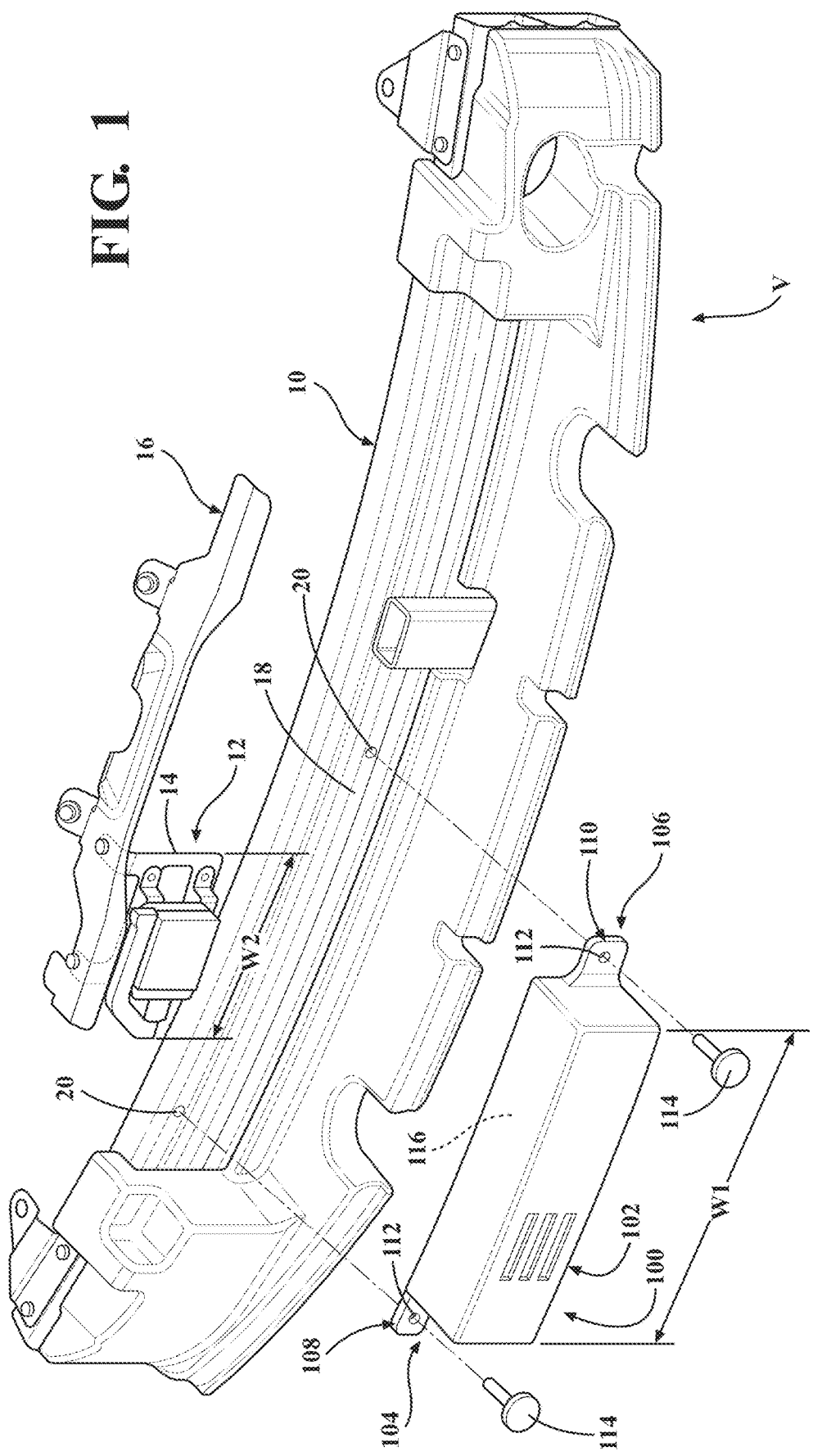
FIG. 1 is a partial, front, perspective view illustrating the front-end of a vehicle including a sensor and one embodiment of an energy absorber shown mounted to a bumper beam of the vehicle.
Figure 2:
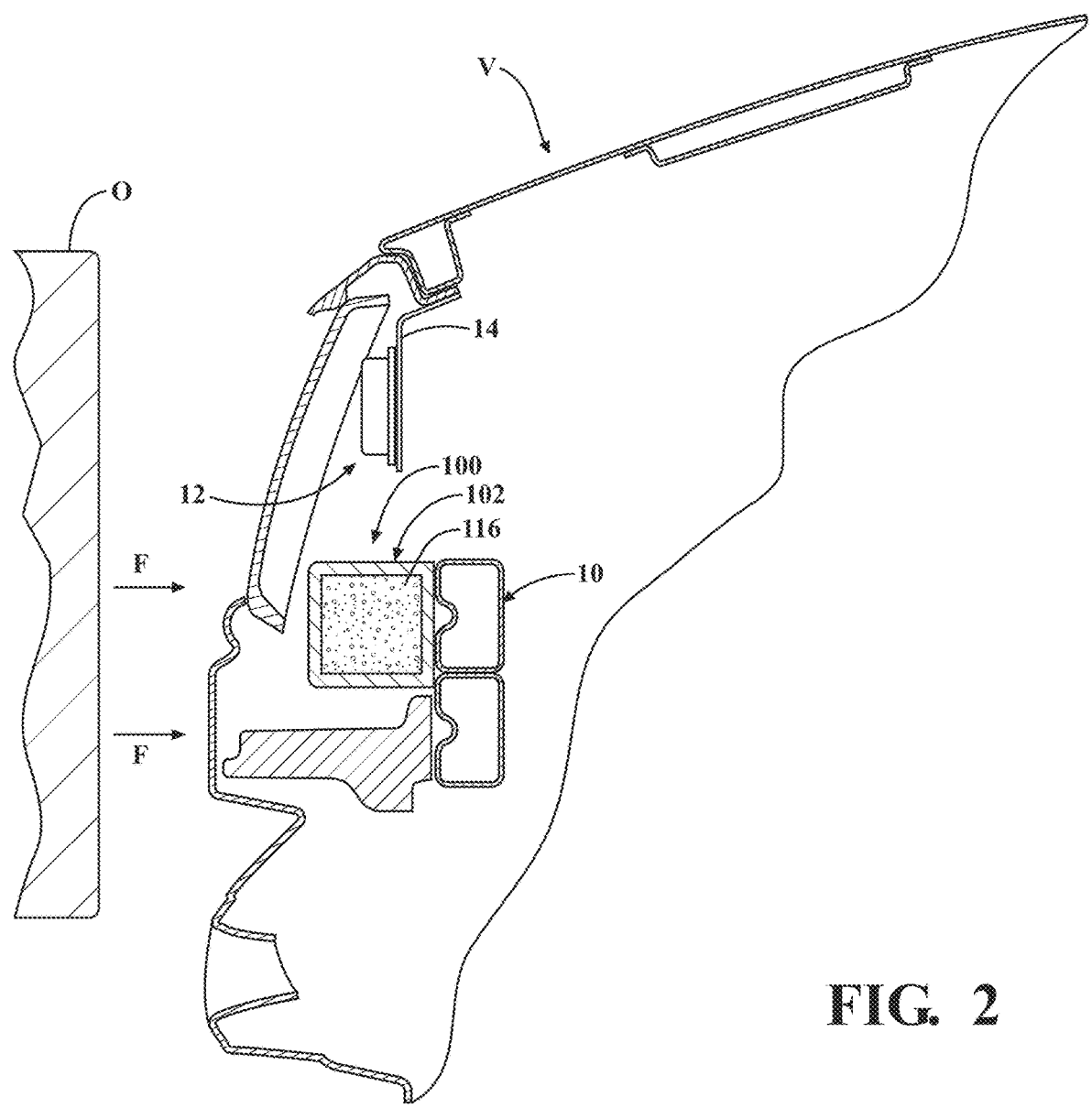
FIG. 2 is a partial, cross-sectional view of the front-end of the vehicle and the energy absorber seen in FIG. 1.

FIGS. 1 and 2 illustrate the front-end of a vehicle V together with one embodiment of an energy absorber (identified by the reference character 100) in accordance with the principles of the present disclosure. In relevant part, the front-end of the vehicle V includes a bumper beam 10 and an electronic sensor 12. The electronic sensor 12 may be any sensor suitable for use in the front-end (or the rear-end) of the vehicle V, including, for example, a radar-based sensor (e.g., an emergency braking sensor, an intelligent cruise control sensor, a pedestrian sensor, etc.). The electronic sensor 12 is supported by a mount 14 such that the electronic sensor 12 is fixed in relation to the bumper beam 10 and may be connected to the vehicle V in any suitable location. For example, in the particular embodiment of the vehicle V seen in FIGS. 1 and 2, the mount 14 is connected to the vehicle V's battery charge port bracket 16.

The energy absorber 100 is fixed in relation to the bumper beam 10, and may be secured thereto, either directly or indirectly (i.e., via an intervening structure), using any suitable mechanism, structure, element, or combination thereof. For example, in the embodiment seen in FIG. 1, the energy absorber 100 is fixedly connected to a (front) end face 18 of the bumper beam 10 (e.g., to the forward-most vertical surface thereof) such that the energy absorber 100 is positioned outwardly (i.e., forwardly) of the electronic sensor 12. When associated with a rear-end of the vehicle V, however, it should be appreciated that the energy absorber 100 would be likewise positioned in relation and fixedly connected to a rear-end face of a bumper beam similar or identical to the bumper beam 10 (e.g., to the rearward-most vertical surface thereof) located at the rear-end of the vehicle V.

The energy absorber 100 includes a housing 102 with opposite ends 104, 106 defining lateral supports 108, 110 having apertures 112 that are configured to receive mechanical fasteners 114 (e.g., screws, rivets, pins, clips, bolts, etc.) that are insertable into corresponding openings 20 formed in the bumper beam 10, either fixedly or removably. Additionally, or alternatively, it is envisioned that the energy absorber 100 and the bumper beam 10 may include corresponding engagement members or surfaces (e.g., snaps, clips, hooks, etc.) that facilitate connection of the energy absorber 100 to the bumper beam 10, such as, for example, in a snap-fit or interference-fit arrangement.

As seen in FIG. 1, the energy absorber 100 defines a width W1 that is greater than or equal to a width W2 defined by the electronic sensor 12 (each of which extends in generally parallel relation to the bumper beam 10) and is oriented in general alignment with the electronic sensor 12. More specifically, the energy absorber 100 is oriented such that the electronic sensor 12 is positioned between the ends 104, 106 of the energy absorber 100. Although shown as being eccentrically mounted to the bumper beam 10 (i.e., such that the energy absorber 100 is located off-center with respect to the bumper beam 10) and below the electronic sensor 12

(i.e., closer to the ground), in alternate embodiments, it is envisioned that the orientations of the energy absorber 100 and the electronic sensor 12 may be varied. For example, depending upon the particular location of the electronic sensor 12, the configuration of the bumper beam 10, spatial requirements, packaging concerns, etc., it is envisioned that the energy absorber 100 may be centrally mounted with respect to the bumper beam 10, that the energy absorber 100 may be vertically aligned with the electronic sensor 12, or that the energy absorber 100 may be positioned above the electronic sensor 12 (i.e., such that the energy absorber 100 is further from the ground).

The energy absorber 100 may include (e.g., may be formed from) any material or combination of materials suitable for the intended purpose of absorbing forces that may be otherwise communicated to the electronic sensor 12 during a low-force impact with the vehicle V, as discussed in further detail below. For example, in the embodiment seen in FIGS. 1 and 2, the energy absorber 100 includes a body 116 formed from a foam having a density of 10 pcf or higher, such as an expanded polypropylene foam. Although shown as being positioned within the housing 102 in FIGS. 1 and 2, in alternate embodiments of the disclosure, it is envisioned that the housing 102 may be omitted, and that the body 116 may be directly connected to the bumper beam 10 through the use of mechanical fasteners (e.g., screws, rivets, pins, clips, bolts, etc.), adhesive(s), etc.

With continued reference to FIGS. 1 and 2, use and functionality of the energy absorber 100 during a low-force impact between the vehicle V and an external object O (e.g., another vehicle, a shopping cart, a road barrier, etc.) will be discussed. Upon impact with the object O, force F is applied to the vehicle V in the direction indicated in FIG. 2. The energy absorber 100, however, is configured and positioned in the path of the force F to interrupt and absorb the force F, which would otherwise be communicated to the electronic sensor 12 and/or the bracket mount 14. By absorbing the force F, the energy absorber 100 thereby protects the electronic sensor 12 to mitigate (if not entirely prevent) damage to the electronic sensor 12 and/or the mount 14, and limit (if not entirely prevent) dislocation (i.e., undesirable displacement) of the electronic sensor 12 and/or the mount 14 to thereby preserve the positions thereof. The energy absorber 100 thus reduces the likelihood of malfunction after the impact as well as the need for repair or replacement of the electronic sensor 12 and/or the mount 14, and, as such, the overall cost associated with ownership and operation of the vehicle V. By protecting the electronic sensor 12 and the mount 14, the energy absorber 100 may also increase the likelihood that the vehicle V will remain in compliance with any applicable regulations and/or safety requirements following the impact.

With reference now to FIGS. 3-14, various alternate embodiments of the energy absorber 100 will be discussed. Each of the embodiments discussed hereinbelow is substantially similar in both structure and function to the energy absorber 100, and accordingly, in the interest of brevity, will be discussed only with respect to any differences therefrom.

Figure 3:
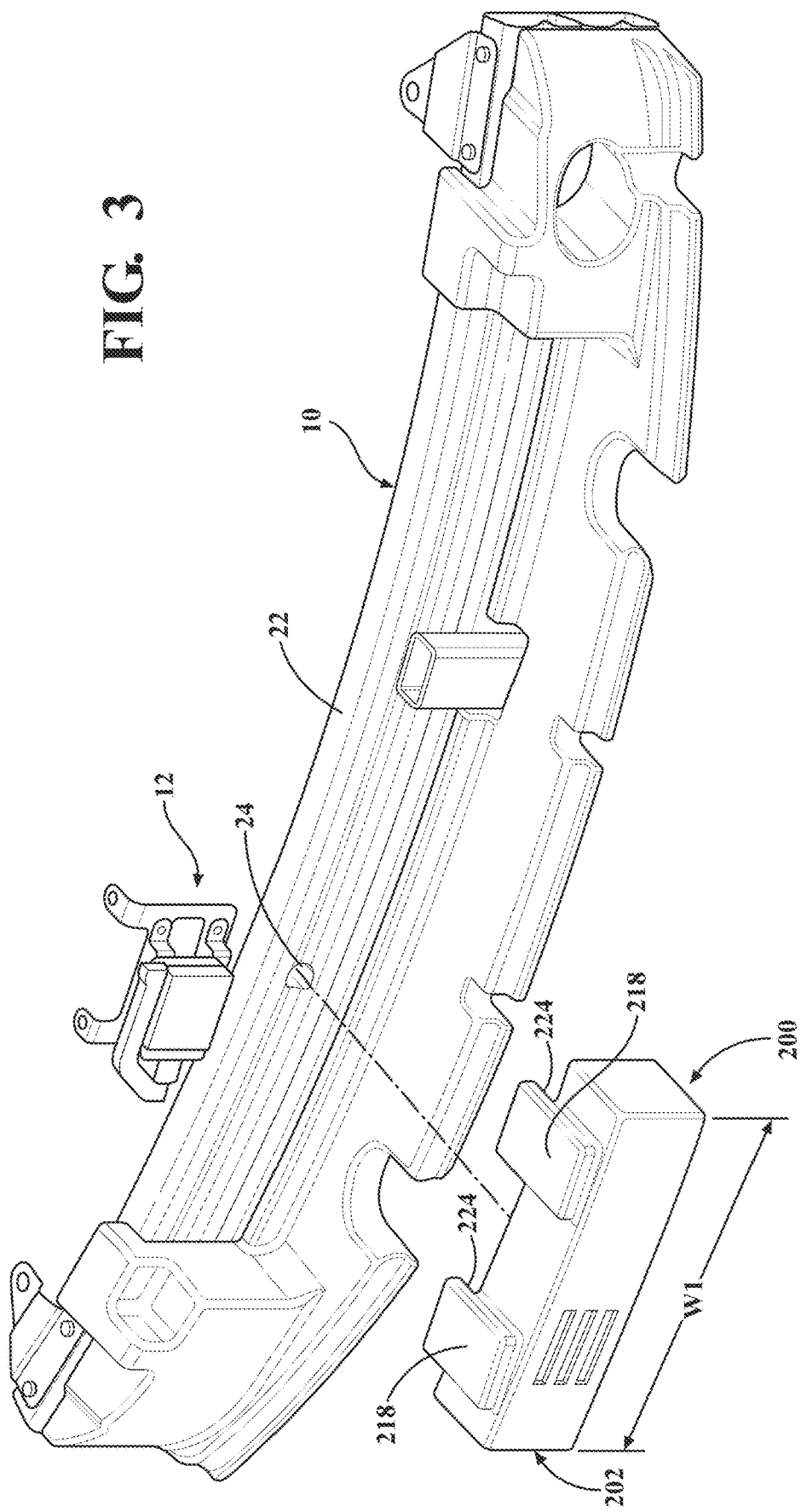
FIG. 3 is a partial, front, perspective view illustrating the front-end of the vehicle with an alternate embodiment of the energy absorber.
Figure 4:
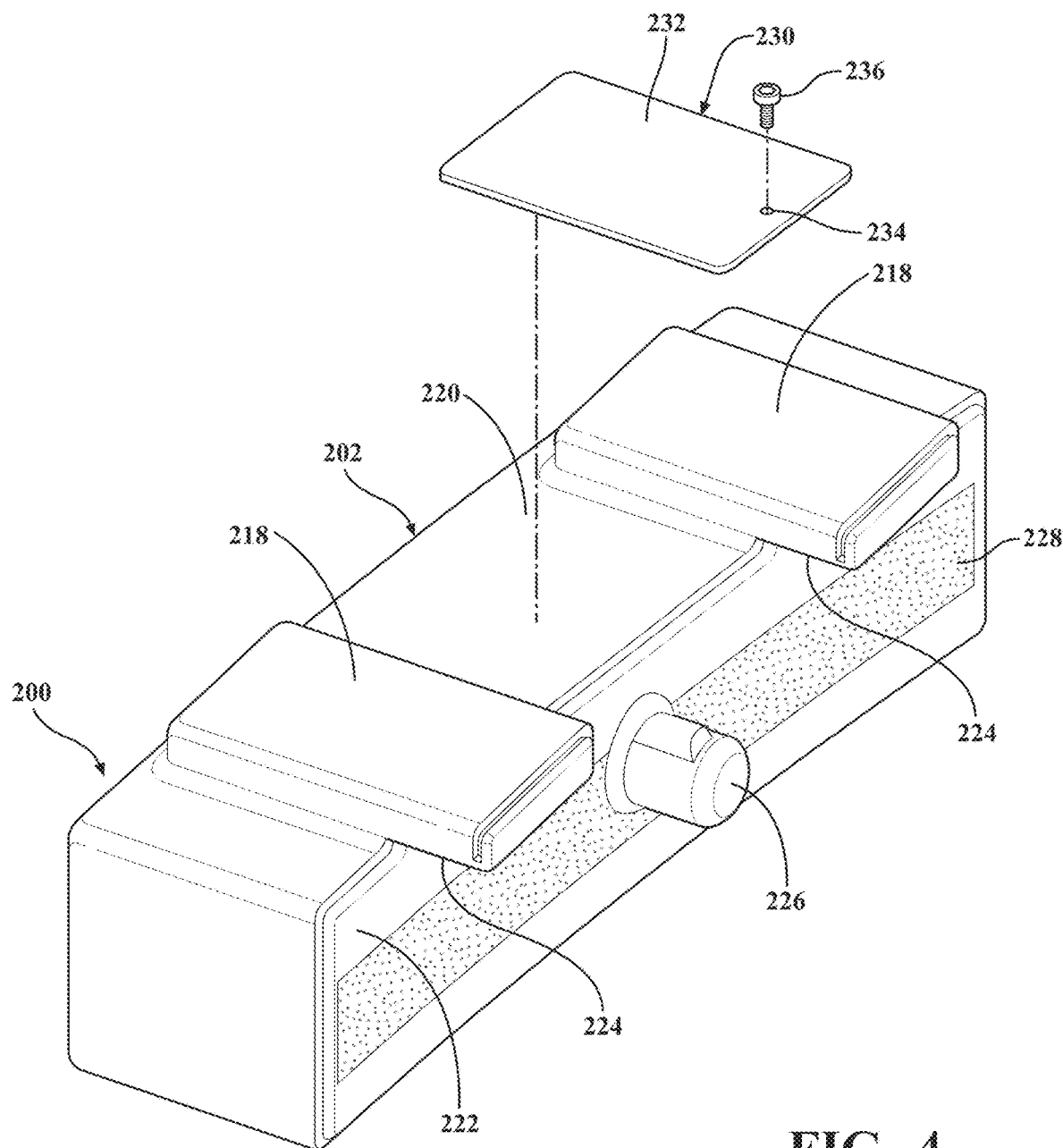
FIG. 4 is a rear, perspective view of the energy absorber seen in FIG. 3.
Figure 5:
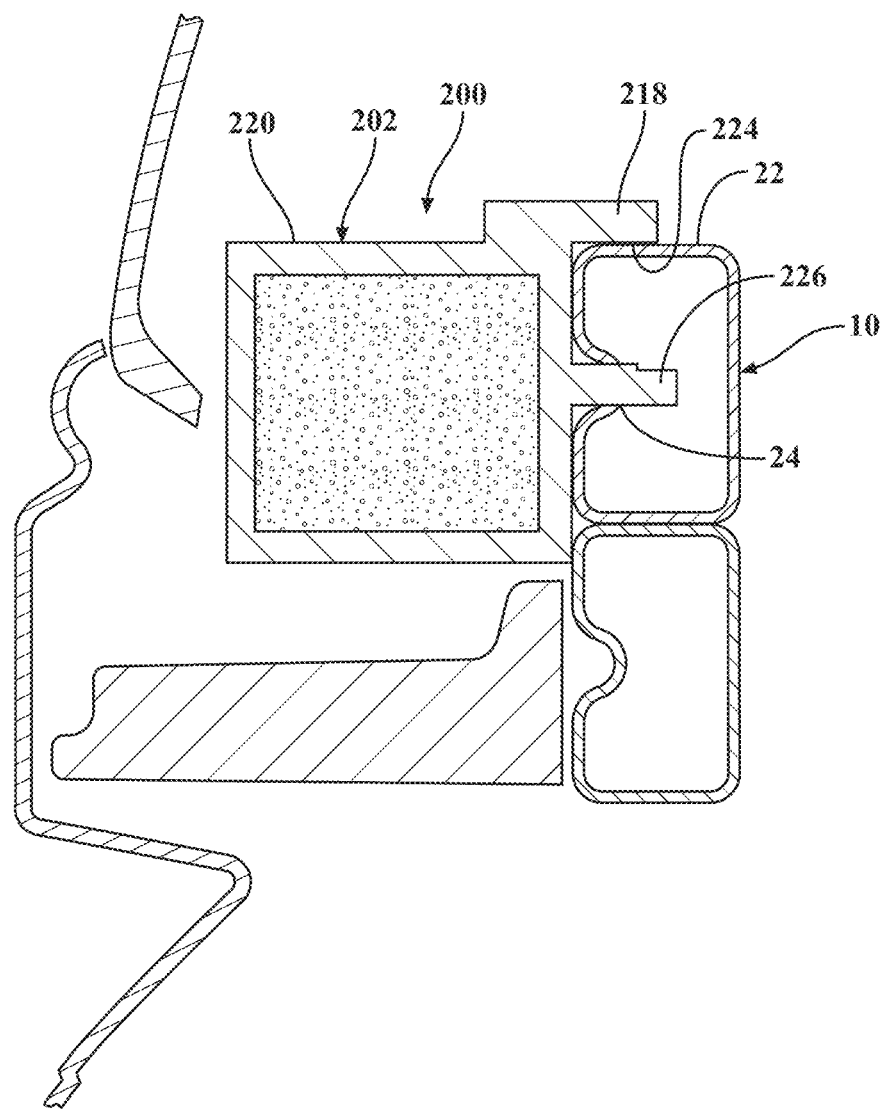
FIG. 5 is a partial, cross-sectional view of the front-end of the vehicle shown with the energy absorber seen in FIG. 4.

FIGS. 3-5 illustrate an embodiment of the energy absorber identified by the reference character 200. As seen in FIG. 3, the energy absorber 200 is devoid of the lateral supports 108, 110 (FIG. 1) included on the energy absorber 100. Instead, the energy absorber 200 includes one or more wings (braces) 218 that extend towards the electronic sensor 12 and the bumper beam 10. The wing(s) 218 may be formed from any suitable material and may be either discrete structures that are connected to the housing 202 of the energy absorber 200 or may be integrally formed therewith. For example, in certain embodiments, it is envisioned that the wing(s) 218 may be monolithically formed with the housing 202 (e.g., via injection molding). The wing(s) 218 extend from an upper surface 220 housing 202 along the length of the vehicle V in transverse (or orthogonal) relation to the width W1 of the energy absorber 200. Although shown as including a pair of wings 218 in the illustrated embodiment, in alternate embodiments of the disclosure, it is envisioned that the number of wings 218 may be varied. For example, the energy absorber 200 may include a single wing 218 only, or three or more wings 218.

In the particular embodiment of the energy absorber 200 shown in FIGS. 3-5, the energy absorber 200 is shown in association with the front-end of the vehicle V. As such, the wings extend rearwardly towards the electronic sensor 12 and the bumper beam 10. When associated with the rear-end of the vehicle V, however, it should be appreciated that the wing(s) 218 would extend towards the electronic sensor 12 and the bumper beam 10 in the opposite direction (i.e., forwardly).

The wing(s) 218 extend beyond a (rear) end face 222 (FIGS. 4, 5) of the energy absorber 200 (e.g., the housing 202) so as to define one or amore shoulders 224 that are configured for contact with an upper surface 22 (FIG. 3) of the bumper beam 10 such that the bumper beam 10 supports the vertical position of the energy absorber 200. To further secure the energy absorber 200 in relation to the bumper beam 10 (e.g., to restrict or prevent lateral movement of the energy absorber 200), it is envisioned that the energy absorber 200 may include a boss 226 (FIGS. 4, 5) that extends outwardly (i.e., rearwardly or forwardly) from the housing 202 for positioning within a corresponding opening 24 defined in the bumper beam 10. Additionally, or alternatively, it is envisioned that the energy absorber 200 may be adhesively secured to the bumper beam 10 (e.g., using one or more adhesive strips 228), as seen in FIG. 4.

The energy absorber 200 may also include an additional support member 230 (FIG. 4) to further maintain the horizontal and/or vertical position of the energy absorber 200 in relation to the bumper beam 10. For example, as seen in FIG. 4, the support member 230 may be configured as a plate 232 that extends from the upper surface 220 of the housing 202 of the energy absorber 200 along the length of the vehicle V and beyond the (rear) end face 222 of the housing 202. The plate 232 includes one or more openings 234 that are configured to receive mechanical fasteners 236 (e.g., screws, rivets, pins, clips, bolts, etc.) such that the mechanical fastener(s) extend into the bumper beam 10.

Figure 6:
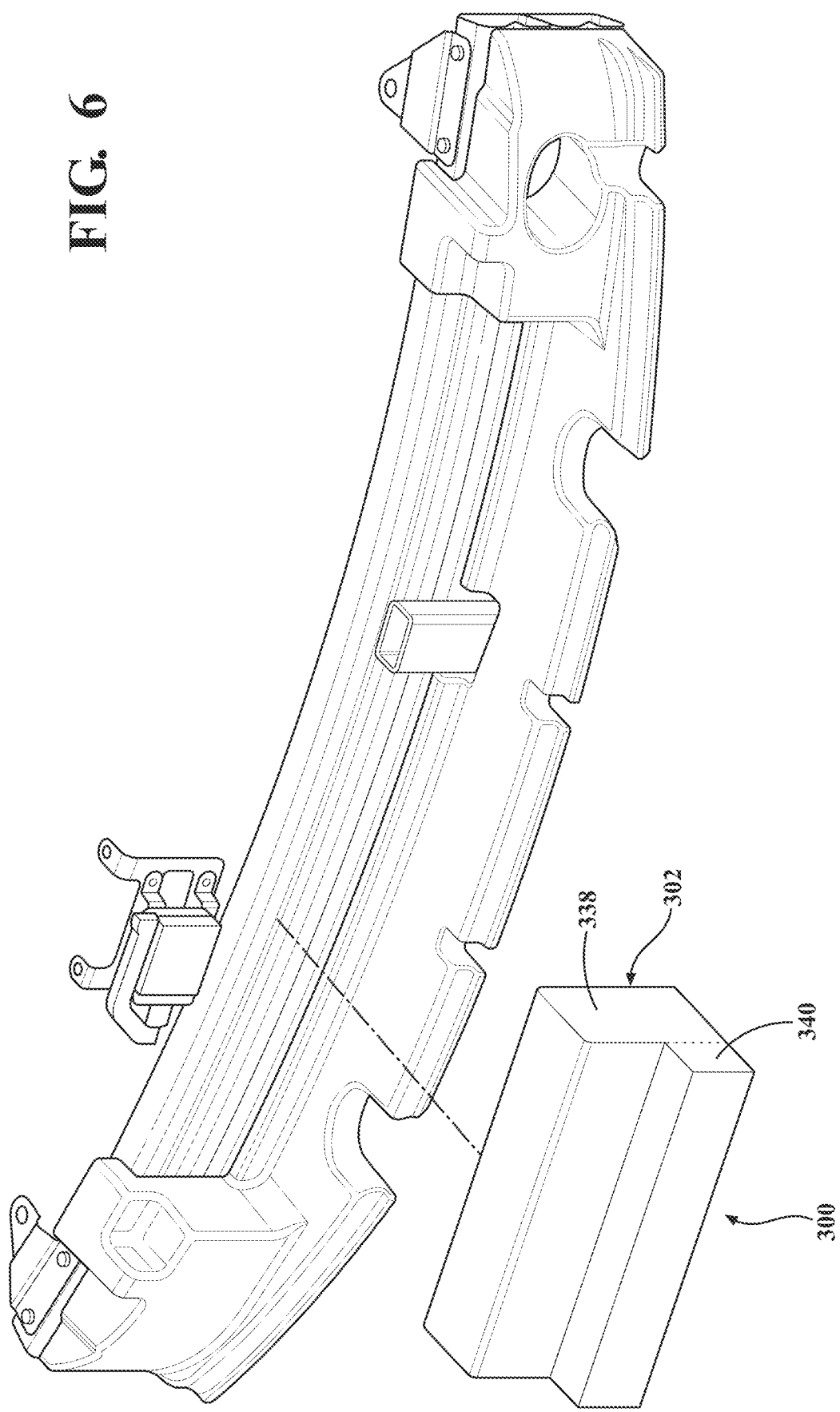
FIG. 6 is a partial, front, perspective view illustrating the front-end of the vehicle with an alternate embodiment of the energy absorber.

FIG. 6 illustrates another embodiment of the energy absorber, which is identified by the reference character 300. In contrast to the energy absorber 100 seen in FIGS. 1 and 2, which includes a generally polygonal (e.g., rectangular or square) cross-sectional configuration, the energy absorber 300 includes a complex cross-sectional configuration. More specifically, the body 316 of the energy absorber 300 includes a rear (first) section 338 and a front (second) section 340 that extends (forwardly) from the rear section 338 such that the energy absorber 300 includes a generally L-shaped cross-sectional configuration. Although illustrated as being monolithically formed in the embodiment of the energy absorber 300 seen in FIG. 6, it is also envisioned that the sections 338, 340 may be formed separately and connected to one another in any suitable manner, such as, for example, via one or more mechanical fasteners, adhesive, etc.

It is envisioned that the body 316 of the energy absorber 300 may be entirely formed from the aforementioned foam (e.g., expanded polypropylene) such that the energy absorber 300 is uniform in construction. Alternatively, however, it is envisioned that the energy absorber 300 may be non-uniform in construction and that the sections 338, 340 may include (e.g., may be formed from), different materials. For example, it is envisioned that the front section 340 may be formed from a foam having a first density and that the rear section 338 may be formed from a foam having a second, different density (i.e., greater than or less than that of the front section 340).

Although shown and described as being devoid of a housing, in certain embodiments of the disclosure, it is envisioned that the energy absorber 300 may further include such a housing (similar to the housings 102, 202 discussed above in connection with the energy absorbers 100, 200, respectively) to accommodate the body 316.

Figure 7:
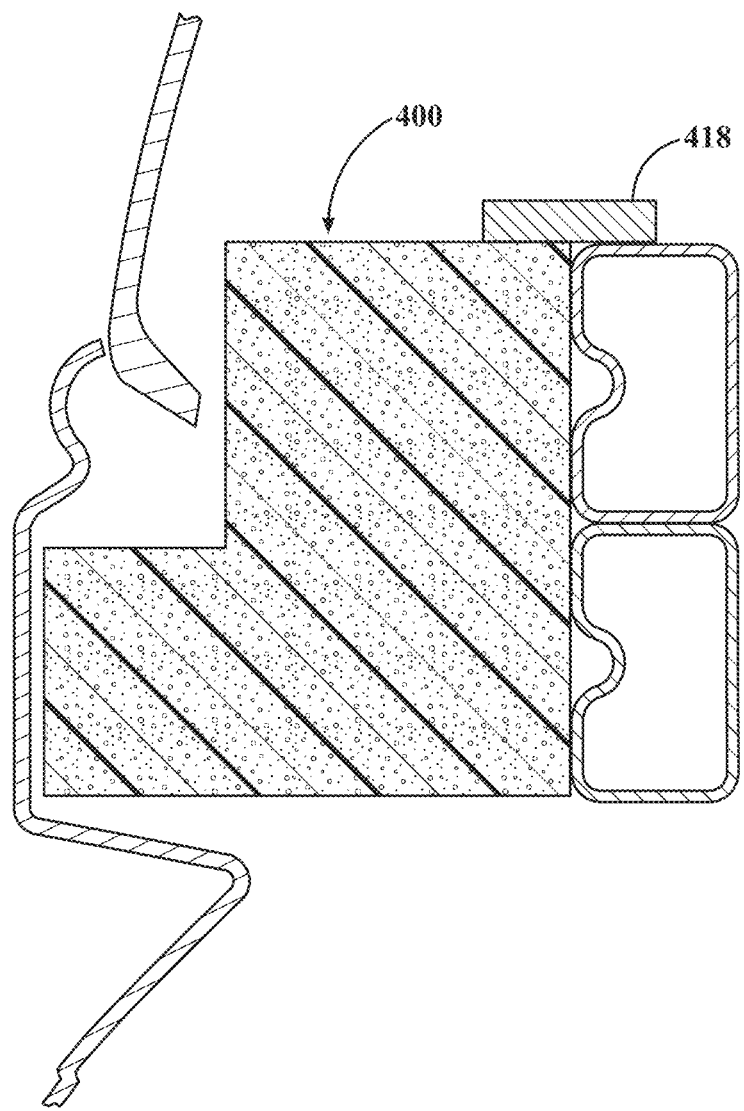
FIG. 7 is a partial, cross-sectional view of the front-end of the vehicle shown with the energy absorber seen in FIG. 6.

FIG. 7 illustrates another embodiment of the energy absorber, which is identified by the reference character 400. The energy absorber 400 is identical to the energy absorber 300 but for the inclusion of one or more wings 418, as discussed above in connection with the energy absorber 200 seen in FIGS. 3-5.

Figure 8:
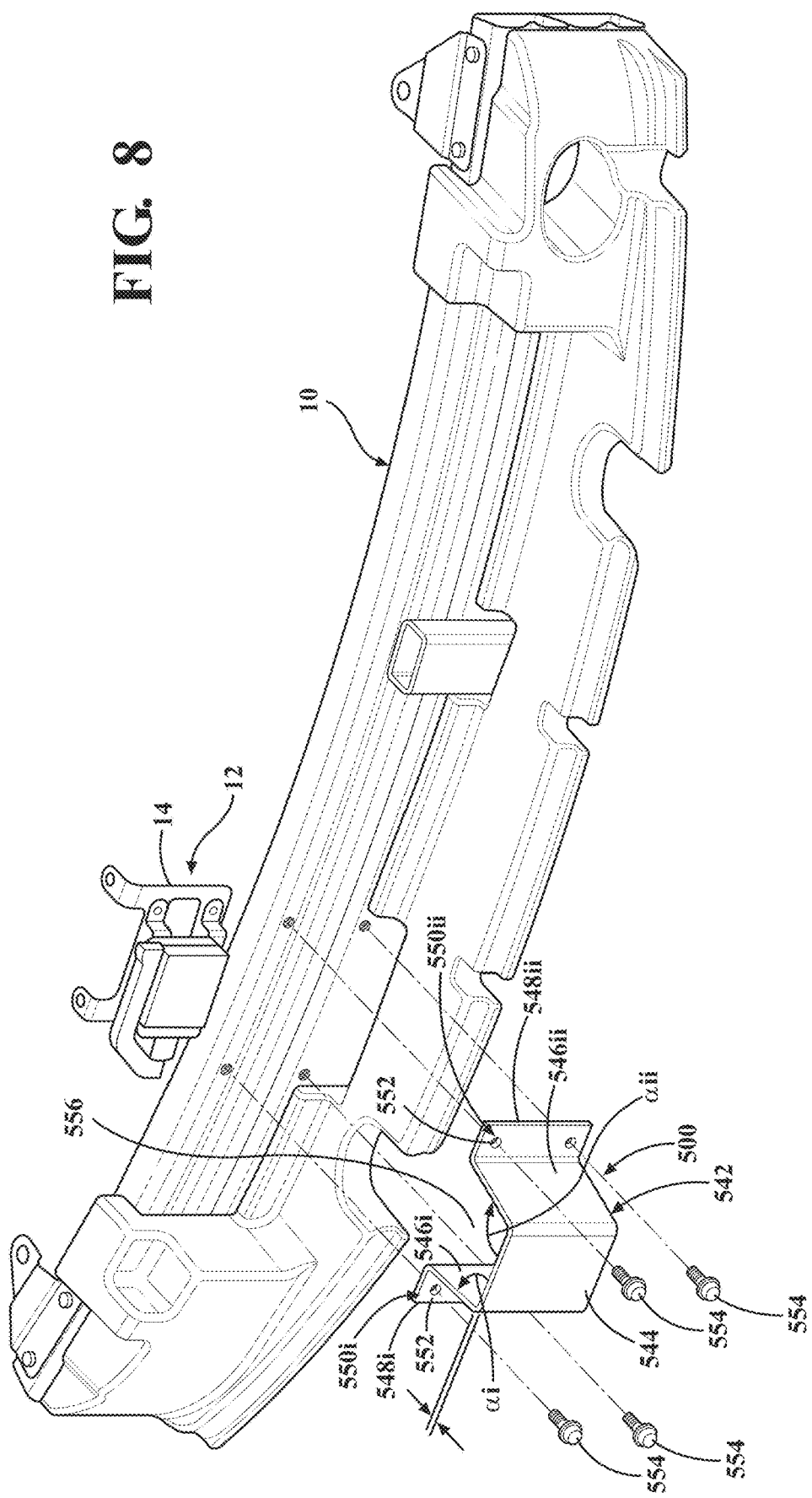
FIG. 8 is a partial, front, perspective view illustrating the front-end of the vehicle with another embodiment of the energy absorber configured as a bracket.
Figure 9:
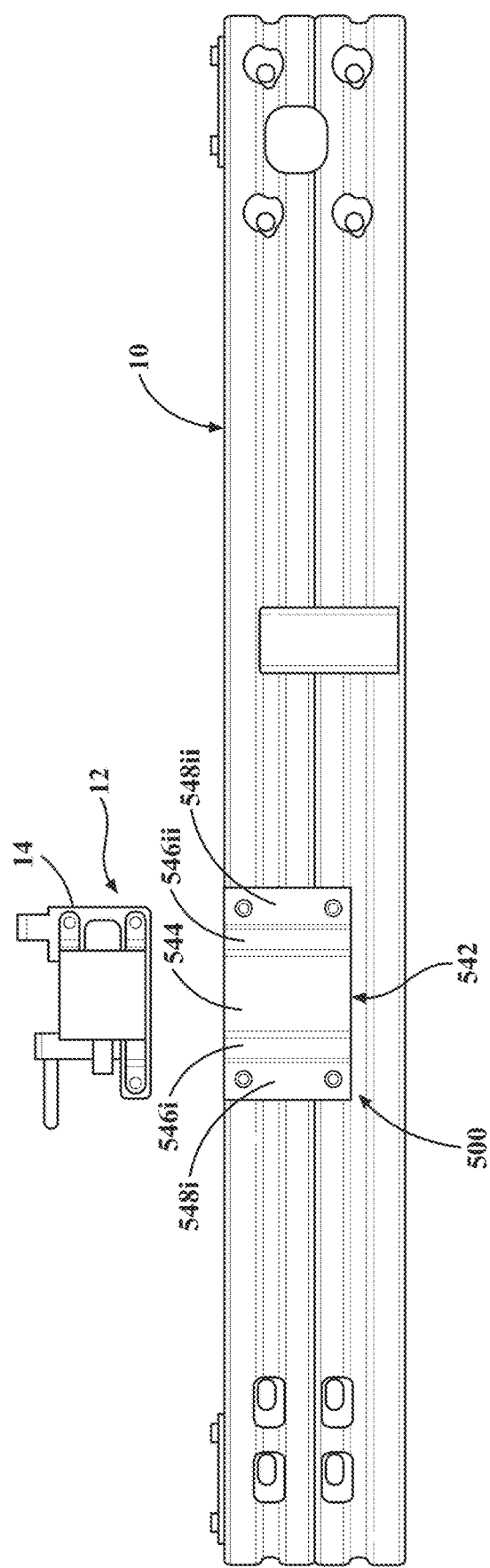
FIG. 9 is a partial, front view illustrating the front-end of the vehicle and the energy absorber seen in FIG. 8.

With reference now to FIGS. 8 and 9, an embodiment of the energy absorber will be described that is identified by the reference character 500. The energy absorber 500 is configured as a bracket 542, and may include (e.g., may be formed from) any suitable material or combination of materials. For example, it is envisioned that the bracket 542 may include one or more metallic materials, such as aluminum, steel, etc., one or more plastics or polymeric materials, carbon fiber, etc., and that the bracket 542 may be formed through any suitable manufacturing process.

The bracket 542 includes a front (first) end wall 544, a pair of side walls 546i, 546ii that extend from the front end wall 544 at angles $\alpha i$, $\alpha ii$, respectively, and flanges 548i, 548ii that extend from the side walls 546i, 546ii, respectively, in generally parallel relation to the front end wall 544. To facilitate connection of the energy absorber 500 to the bumper beam 10, the flanges 548i, 548ii may include engagement structures 550i, 550ii, respectively, which, in the illustrated embodiment, include a series of apertures 552 that are configured to receive one or more mechanical fasteners 554 (e.g., screws, rivets, pins, clips, bolts, etc.). Additionally, or alternatively, it is envisioned that the bracket 542 (e.g., the flanges 548i, 548ii) may be welded or adhesively secured to the bumper beam 10, or that the flanges 548i, 548ii may be configured and dimensioned for receipt within corresponding openings, slits, brackets, or other such structure included on (or formed in) the bumper beam 10. For example, it is envisioned that the bumper beam 10 may define pockets or the like into which the flanges 548i, 548ii may be inserted (e.g., from above).

The bracket 542 defines an open interior region 556 between the side walls 546i, 546ii that is positioned in general alignment with the electronic sensor 12 in a manner consistent with the discussion above regarding the energy absorber 100 (FIGS. 1, 2). When subject to an impact, the open interior region 556 allows the energy absorber 500 to flex and/or deform to thereby absorb the force F (FIG. 2) that would otherwise be communicated to the electronic sensor 12 and/or the mount 14 absent the energy absorber 500. In the embodiment seen in FIGS. 8 and 9, the bracket 542 is configured such that the side walls 546i, 546ii form equivalent obtuse angles $\alpha$ with the front end wall 544 (e.g., to increase the force-absorption capabilities of the bracket 542). In various embodiments of the disclosure, however, the particular orientation of the side walls 546i, 546ii may be varied to alter the angles $\alpha i$, $\alpha ii$. For example, the side walls 546i, 546ii may be arranged so as to increase or decrease the angles $\alpha i$, $\alpha ii$. It is also envisioned that, in certain embodiments, the side walls 546i, 546ii may extend from the front end wall 544 such that the angles $\alpha i$, $\alpha ii$ are dissimilar.

Although the bracket 542 is configured such that the front end walls 544 and the side walls 546i, 546ii define equivalent thicknesses T in the embodiment seen in FIGS. 8 and 9, in alternate embodiments of the disclosure, it is envisioned that the thickness T may be varied between the front end wall 544 and the side walls 546i, 546ii. For example, the thickness T of the front end wall 544 may be greater than (or less than) the thickness T of the side wall 546i and/or the side wall 546ii to promote deformation of the bracket 542 in a particular manner. It is also envisioned that one or more of the front end wall 544 and the side walls 546i, 546ii may include one or more weakened portions (e.g., reliefs, openings, slits, etc.) to promote controlled deformation of the bracket 542.

Figure 10:
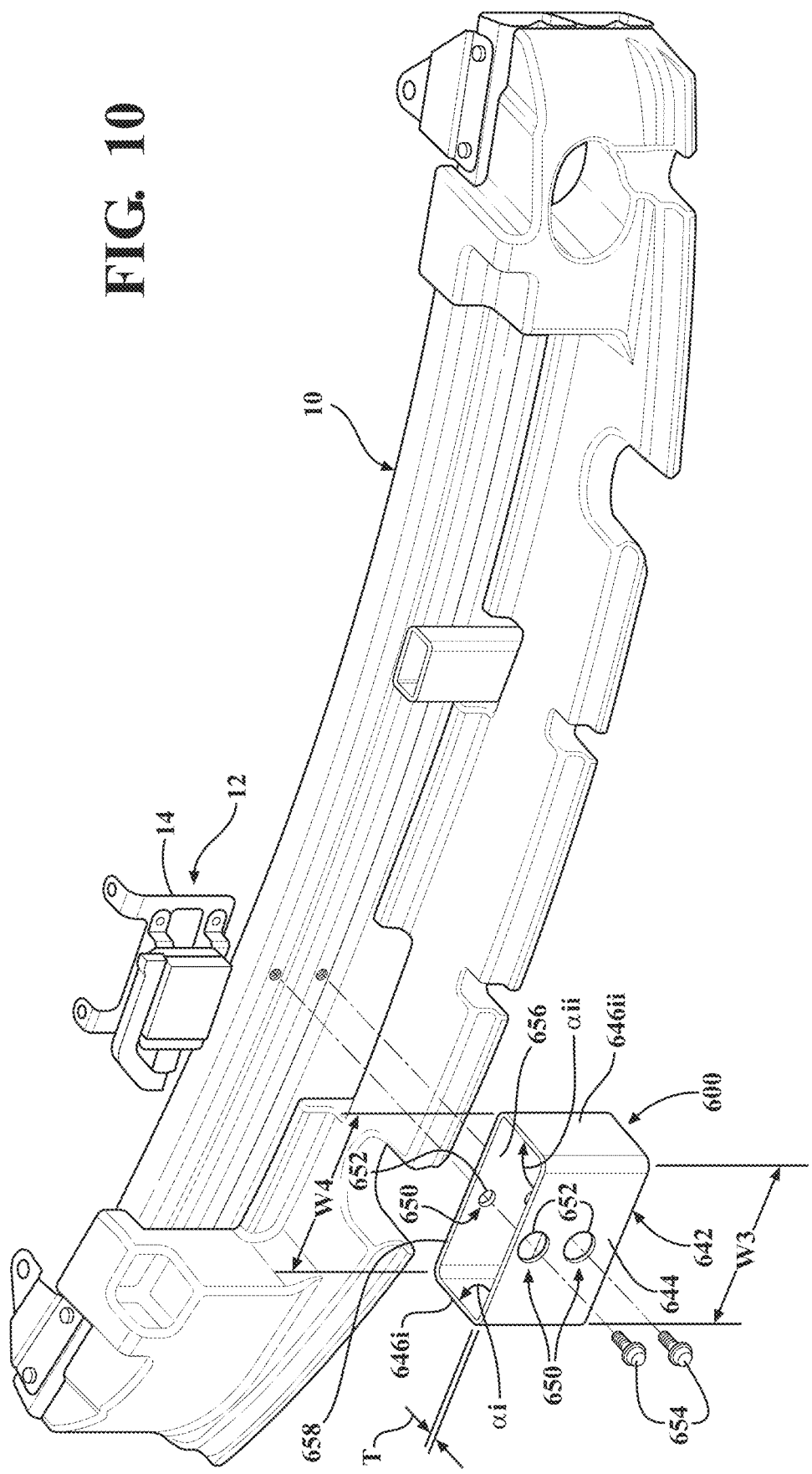
FIG. 10 is a partial, front, perspective view illustrating an alternate configuration for the bracket seen in FIGS. 8 and 9.

FIG. 10 illustrates another embodiment of the energy absorber, which is identified by the reference character 600. The energy absorber 600 is configured as a bracket 642 similar to the bracket 542 discussed above with respect to FIGS. 8 and 9. However, in addition to a front (first) end wall 644 and a pair of side walls 646i, 646ii, the bracket 642 further includes a rear (second) end wall 658 such that the end walls 644, 646 extend between and connect the side walls 646i, 646ii. Although shown as including a generally rectangular cross-sectional configuration, in alternate embodiments of the disclosure, it is envisioned that the particular dimensions and arrangement of the end walls 644, 658 and the side walls 646i, 646ii may be varied so as to vary the cross-sectional configuration of the bracket 642. For example, the front end wall 644 may define a width W3 less than a width W4 of the rear end wall 658 such that the side walls 646i, 646ii extend from the front end wall 644 at angles $\alpha i$, $\alpha ii$, respectively, greater than 90°, as discussed above in connection with FIGS. 8 and 9. Alternatively, the width W3 of the front end wall 644 may exceed the width W4 of the rear end wall 658 such that the angles $\alpha i$, $\alpha ii$ are less than 90°.

As discussed above in connection with the energy absorber 500, the bracket 642 defines an open interior region 656 that is positioned in general alignment with the electronic sensor 12 to allow the energy absorber 600 to flex and/or deform to thereby absorb the force F (FIG. 2) that would otherwise be communicated to the electronic sensor 12 and/or the mount 14 in the absence of the energy absorber 600.

To facilitate connection of the energy absorber 600 to the bumper beam 10, the energy absorber 600 includes one or more engagement structures 650. In the illustrated embodiment, for example, the engagement structures 650 include a series of apertures 652 formed in the end walls 644, 658 that are configured to receive one or more mechanical fasteners 654 (e.g., screws, rivets, pins, clips, bolts, etc.). Additionally, or alternatively, it is envisioned that the bracket 642 may be welded or adhesively secured to the bumper beam 10, or that the bracket 642 may include one or more attachment members (e.g., hooks or the like) that are configured for engagement with corresponding receipt structures (e.g. eyelets, openings, or the like) included on (or formed in) the bumper beam 10.

Although the end walls 644, 658 and the side walls 646i, 646ii are illustrated as defining an equivalent (uniform) thicknesses T in the embodiment seen in FIG. 10, in alternate embodiments of the disclosure, it is envisioned that the thickness T of the front end wall 644, the rear end wall 658, and/or the side walls 646i, 646ii may be varied. For example, the thicknesses T of the side walls 646i, 646ii may be greater than that of the front end wall 644 and/or the rear end wall 658 to promote deformation of the bracket 642 in a particular manner. It is also envisioned that one or more of the end walls 644, 658 and the side walls 646i, 646ii may include one or more weakened portions (e.g., reliefs, openings, slits, etc.) to promote controlled deformation of the bracket 642.

Figure 11:
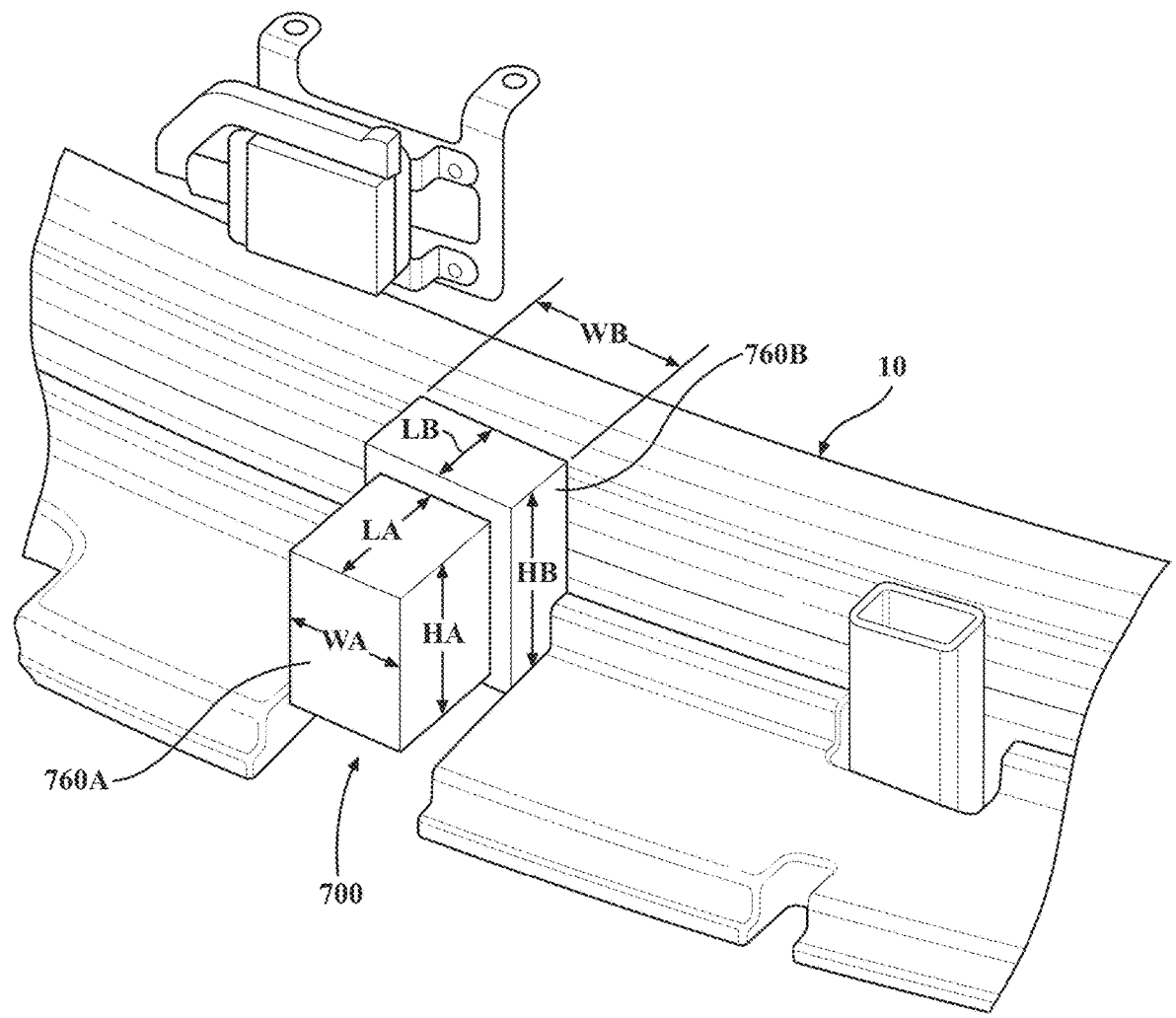
FIG. 11 is a partial, front, perspective view illustrating the front-end of the vehicle with another embodiment of the energy absorber including first and second absorption members.

FIG. 11 illustrates another embodiment of the energy absorber, which is identified by the reference character 700. The energy absorber 700 includes a front (first) absorption member 760A and a rear (second) absorption member 760B. The absorption members 760A, 760B are configured as discrete structures and may be connected to each other, and to the bumper beam 10, in any suitable manner, such as, for example, through the use of one or more mechanical fasteners (e.g., screws, rivets, pins, clips, bolts, etc.) or adhesives, via welding, etc. Although shown as including two absorption members 760A, 760B in the embodiment seen in FIG. 11, it is envisioned that the number of absorption members 760 may be increased in alternate embodiments of the disclosure.

In the illustrated embodiment, the absorption members 760A, 760B each include a uniform, generally polygonal (e.g., rectangular or square) cross-sectional configuration. More specifically, the absorption member 760A defines a width WA, a length LA, and a height HA, and the absorption member 760B defines a width WB, a length LB, and a height HB, wherein the width WA is less than the width WB, the length LA is greater than the length LB, and the height HA is less than the height HB. Given the disparity in dimensions between the absorption members 760A, 760B, the absorption capabilities of the absorption member 760A differ from those of the absorption member 760B. It should be appreciated, however, that, in alternate embodiments, the particular configuration and dimensions of the absorption members 760A, 760B may be varied without departing from the scope of the present disclosure. For example, depending upon the configuration of the bumper beam 10, spatial requirements, packaging concerns, etc., it is envisioned that the absorption members 760A, 760B may be identical in configuration and dimensions, or that one or more of the absorption members 760A, 760B may include an irregular cross-sectional configuration (e.g., an L-shaped configuration, as discussed above in connection with the energy absorber 300 seen in FIG. 6).

In certain embodiments, it is envisioned that the absorption members 760A, 760B may include (e.g., may be formed from) the same material, which may include any suitable metallic materials (e.g., aluminum, steel, etc.) and/or non-metallic materials (e.g., foam, polymeric materials, plastic materials, etc.), either individually or in combination. Alternatively, it is envisioned that the absorption members 760A, 760B may include different materials. For example, in the particular embodiment seen in FIG. 11, the absorption member 760A is formed from a foam having a density of 10 pcf or higher, such as expanded polypropylene foam, and the absorption member 760B is formed from aluminum. To assemble and connect the energy absorber 700 to the bumper beam 10, the absorption member 760B is welded (or otherwise secured) to the bumper beam 10, and the absorption member 760A is adhesively secured to the absorption member 760B.

In various embodiments of the disclosure, to vary the absorption capabilities of the energy absorber 700, it is envisioned that the absorption members 760A, 760B may be either solid in construction, or that the absorption members 760A, 760B may define open interior spaces or cavities. For example, it is envisioned that either or both of the absorption members 760A, 760B may include an internal honeycomb structure.

Figure 12:
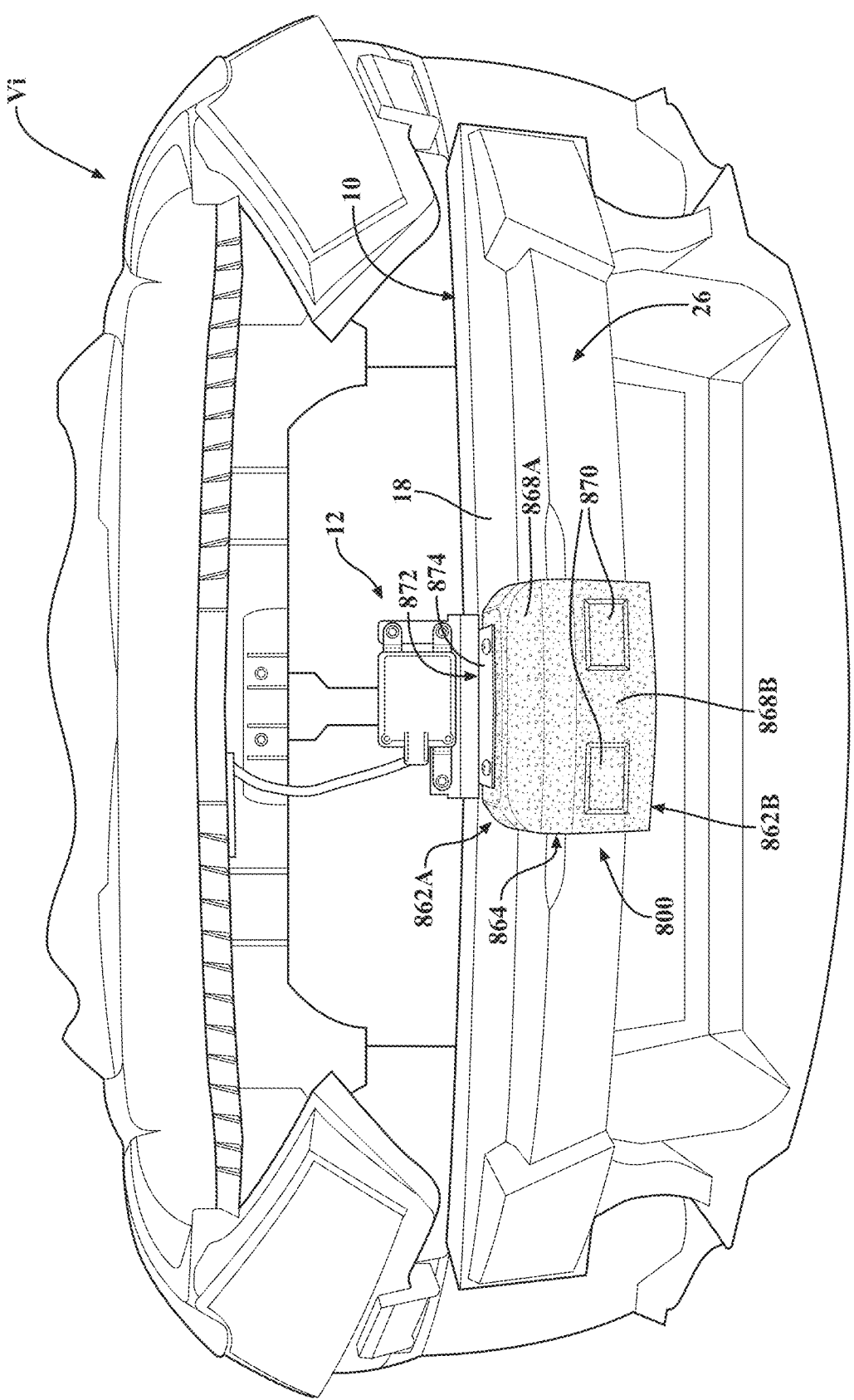
FIG. 12 is a partial, front, perspective view illustrating the front-end of the vehicle including another embodiment of the energy absorber.
Figure 13:
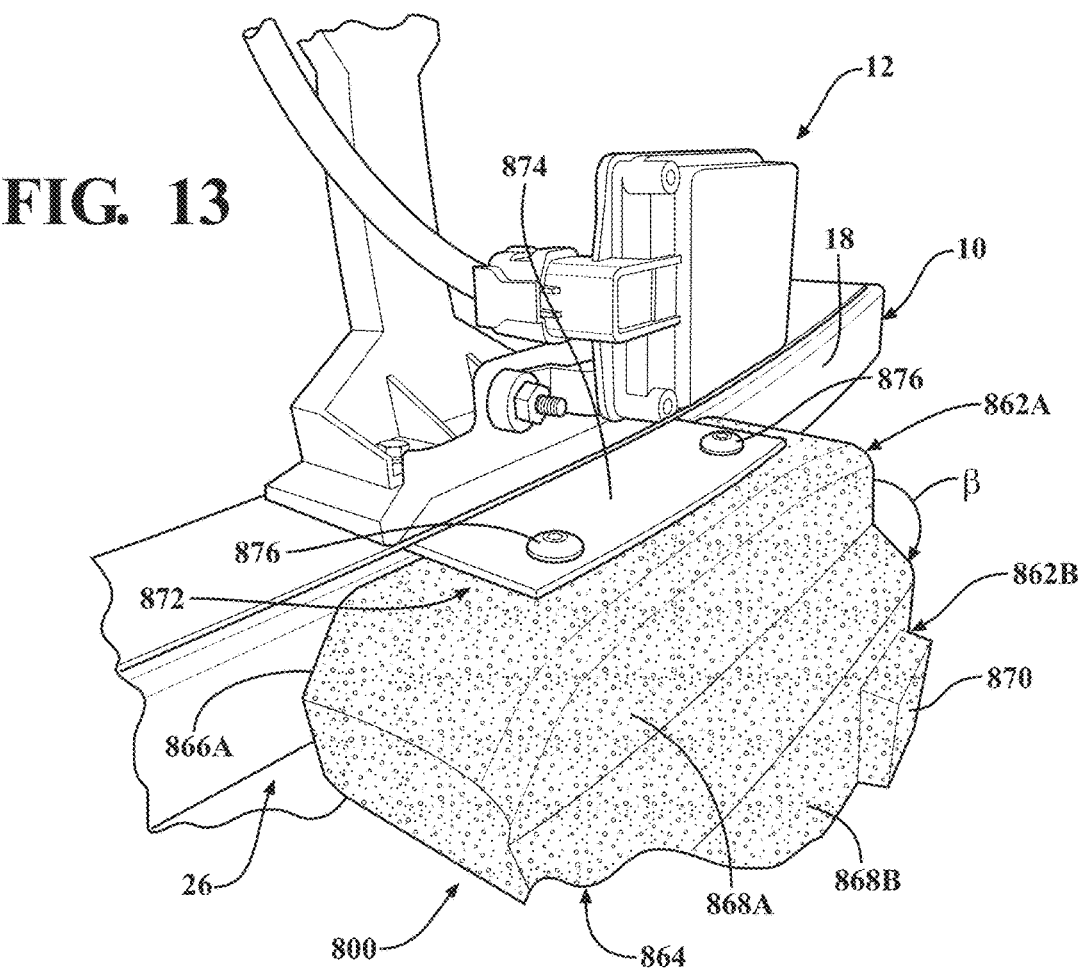
FIG. 13 is a partial, side, perspective view illustrating the front-end of the vehicle and the energy absorber seen in FIG. 12.
Figure 14:
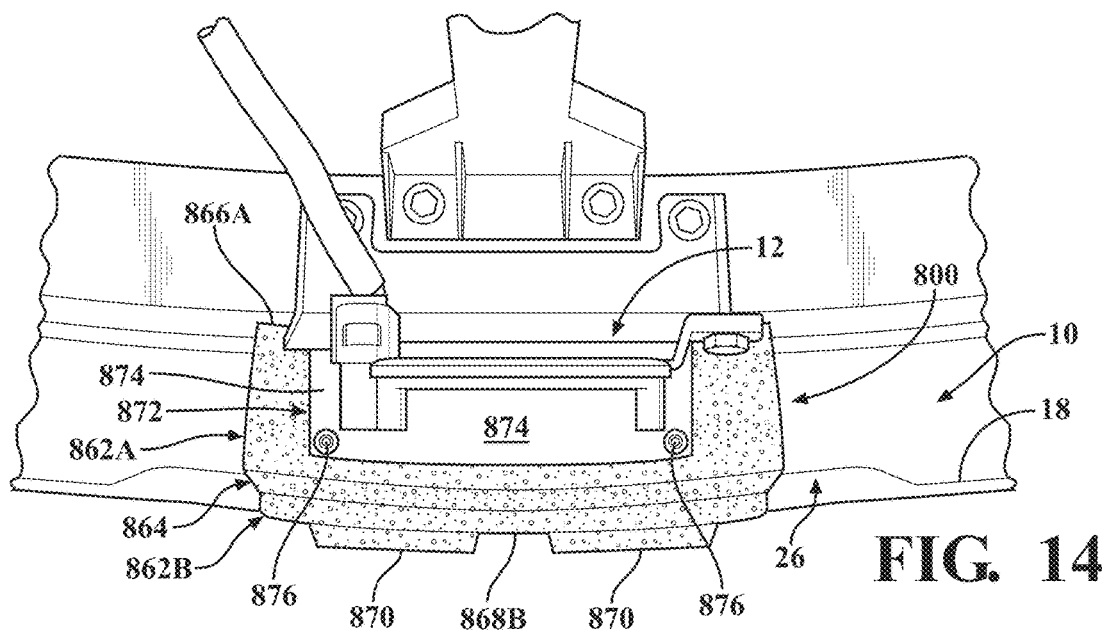
FIG. 14 is a partial, top view illustrating the front-end of the vehicle and the energy absorber seen in FIG. 12.

FIGS. 12-14 illustrate another embodiment of the energy absorber (identified by the reference character 800) shown in association with the front-end of a vehicle Vi. In the illustrated embodiment, in addition to the bumper beam 10 and the electronic sensor 12, the front-end of the vehicle Vi includes a body component 26, which may be configured as an additional structural element, fascia, a supplemental shock absorber, etc. The energy absorber 800 is configured in correspondence with the front-end of the vehicle Vi so as to define a contour that approximates (or matches) those defined by the bumper beam 10 and the body component 26. More specifically, in the illustrated embodiment, the energy absorber 800 includes an upper (first) portion 862A, and a lower (second) portion 862B that is positioned vertically beneath the upper portion 862A, and a bridge portion 864 that extends therebetween. As discussed in connection with the preceding embodiments, the energy absorber 800 is positioned in general alignment with the electronic sensor 12 so as to facilitate absorption of the force F (FIG. 2) applied to the vehicle Vi during a low-force impact, and thereby protect the electronic sensor 12 and guard against dislocation.

The upper portion 862A includes a rear (first) end wall 866A and a front (second) end wall 868A, which extend in generally parallel relation to the front end face 18 of the bumper beam 10 (e.g., to the forward-most vertical surface thereof). The lower portion 862B includes a front end wall 868B, and is connected to the upper portion 862A by the bridge portion 864. Although the bridge portion 864 is shown as extending from the upper portion 862A at an obtuse angle β (FIG. 13) in FIGS. 12-14, in alternate embodiments of the disclosure, it is envisioned that the bridge portion 864 may be oriented in generally orthogonal relation to the upper portion 862A (and the lower portion 862B) (i.e., such that the angle β is approximately 90°). The bridge portion 864 is configured and positioned such that the upper portion 862A and the lower portion 862B are located at different positions along the length of the vehicle Vi (i.e., such that the lower portion 862B is positioned forwardly of the upper portion 862A), whereby the energy absorber 800 includes an irregular, stepped cross-sectional configuration that allows the energy absorber 800 to cloak or otherwise cover the bumper beam 10 and the body component 26.

As discussed above in connection with the preceding embodiments, the energy absorber 800 may be formed from any suitable metallic or non-metallic materials, either exclusively or in combination. For example, in the embodiment seen in FIGS. 12-14, the energy absorber 800 is formed from the aforedescribed expanded polypropylene foam. Although shown as being of monolithic construction in FIGS. 12-14 (i.e., such that the upper portion 862A, the lower portion 862B, and the bridge portion 864 are integrally formed), such as via injection molding, for example, in alternate embodiments of the disclosure, it is envisioned that the upper portion 862A, the lower portion 862B, and/or the bridge portion 864 may be formed as separate, discrete structures. In such embodiments, the upper portion 862A, the lower portion 862B, and the bridge portion 864 may be connected in any suitable manner, such as, for example, through the use of mechanical fasteners (e.g., screws, rivets, pins, clips, bolts, etc.), adhesives, etc.

To further enhance the absorption capabilities of the energy absorber 800, it is envisioned that the energy absorber 800 may include one or more supplemental absorption members 870. In the embodiment illustrated in FIGS. 12-14, for example, the supplemental absorption members 870 are illustrated as being connected to (or formed integrally with) the front end wall 868B of the lower portion 862B. It should be appreciated, however, that the particular location (and configuration) of the supplemental absorption member(s) 870 may be varied in alternate embodiments of the energy absorber 800, depending, for example, upon the configuration of the bumper beam 10, the configuration of the body component 26, spatial requirements, packaging concerns, etc. Additionally, although shown as being formed from the same material as the upper portion 862A, the lower portion 862B, and the bridge portion 864, and as being integrally formed therewith, in alternate embodiments, it is envisioned that the absorption member(s) 870 may be formed as separate, discrete structures, and that the absorption member(s) 870 may include (e.g., may be formed from) one or more different materials. In such embodiments, the absorption member(s) 870 may be connected to the upper portion 862A, the lower portion 862B, and/or the bridge portion 864 in any suitable manner, such as, for example, through the use of mechanical fasteners (e.g., screws, rivets, pins, clips, bolts, etc.), adhesives, etc.

The energy absorber 800 may be secured or otherwise connected to the front-end of the vehicle Vi (e.g., to the bumper beam 10 and/or the body component 26) in any manner described hereinabove in connection with the preceding embodiments. For example, the energy absorber 800 may be adhesively secured to the bumper beam 10 and/or the body component 26. Additionally, or alternatively, an attachment member 872 may be utilized to connect the energy absorber 800 to the vehicle Vi. In the embodiment seen in FIGS. 12-14, for example, the attachment member 872 is configured as a metallic brace 874 that extends between, and is secured to, the bumper beam 10 (or other such suitable structure on the vehicle Vi) and the energy absorber 800. It is envisioned that the brace 874 may be secured to the vehicle Vi and the energy absorber 800 in any suitable manner. For example, the brace 874 may be welded to the bumper beam 10 (or integrally formed therewith), and may be secured to the energy absorber 800 using one or more mechanical fasteners 876 (e.g., screws, rivets, pins, clips, bolts, etc.).

Although shown as being generally planar in the embodiment seen in FIGS. 12-14, it should be appreciated that the particular configuration of the attachment member 872 may be varied in alternate embodiments of the disclosure. For example, the attachment member 872 may include one or more projections that extend from the bumper beam 10 (or other such suitable structure on the vehicle Vi) for insertion into the energy absorber 800 (e.g., into one or more corresponding openings) such that the projections are concealed by the energy absorber 800.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments. For example, although generally discussed in the context of the front-end of the vehicle V (FIG. 1) herein, as mentioned above, it should be appreciated that any of the various embodiments of the presently disclosed energy absorber may be utilized in the rear-end of the vehicle V as well.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle comprising:
   a bumper assembly defining opposite lateral ends and an overall width extending therebetween, the bumper assembly defining a recessed area with a shelf located between the opposite lateral ends thereof;
   an electronic sensor fixed in relation to the bumper assembly in cantilevered relation; and
   an energy absorber positioned within the recessed area and spaced above and rearward of a forward edge of the shelf to protect the electronic sensor and reduce dislocation of the electronic sensor by absorbing energy resulting from an impact between the vehicle and an external object, the energy absorber defining opposite lateral ends and an overall width extending therebetween less than the overall width of the bumper assembly such that the opposite lateral ends of the energy absorber are spaced inwardly from the opposite lateral ends of the bumper assembly.

2. The vehicle of claim 1, wherein the electronic sensor extends forwardly of the bumper assembly.

3. The vehicle of claim 1, wherein the electronic sensor defines an overall width less than the overall width of the energy absorber.

4. The vehicle of claim 1, wherein the bumper assembly includes an end face and opposing sidewalls collectively defining the recessed area, the opposing sidewalls extending axially forward from the end face along a length of the vehicle.

5. The vehicle of claim 4, wherein the energy absorber is connected to the end face of the bumper assembly such that the energy absorber is positioned forwardly of the electronic sensor.

6. The vehicle of claim 5, wherein the energy absorber is generally aligned with the electronic sensor.

7. The vehicle of claim 1, wherein each lateral end of the energy absorber includes a support configured to receive a fastener to secure the energy absorber in relation to the bumper assembly.

8. The vehicle of claim 7, wherein the supports are located in dissimilar vertical positions.

9. The vehicle of claim 8, wherein the energy absorber includes a first support at a lower end thereof and a second support at an upper end thereof.

10. A vehicle comprising:
a bumper assembly defining an overall width extending transversely in relation to a length of the vehicle, the bumper assembly including opposite lateral ends and a recessed area with a shelf located therebetween;
an electronic sensor fixed in relation to the bumper assembly; and
an energy absorber positioned within the recessed area and spaced above and rearward of a forward edge of the shelf to absorb energy resulting from an impact with the vehicle, the energy absorber defining an overall width extending transversely in relation to the length of the vehicle less than the overall width of the bumper assembly.

11. The vehicle of claim 10, wherein the energy absorber is positioned vertically below the electronic sensor.

12. The vehicle of claim 10, wherein the bumper assembly and the energy absorber each include opposing lateral ends, the lateral ends of the energy absorber being spaced inwardly from the lateral ends of the bumper assembly.

13. The vehicle of claim 10, wherein the energy absorber includes:
a body portion having opposite first and second ends;
a first support extending laterally outward from the first end of the body portion; and
a second support extending laterally outward from the second end of the body portion, the first support and the second support each being configured to receive a fastener to secure the energy absorber in relation to the bumper assembly.

14. The vehicle of claim 13, wherein the first support is positioned adjacent to an upper end of the body portion and the second support is positioned adjacent to a lower end of the body portion such that the second support is vertically offset from the first support.

\* \* \* \* \*